Patented Feb. 6, 1951

2,540,401

UNITED STATES PATENT OFFICE 2,540,401

PHOTOGRAPHIC SILVER HALIDE EMULSION CONTAINING COLOR COUPLER

Philibert Leopold Jozef Raymond Merckx, Mortsel-Antwerp, Belgium, assignor to Gevaert Photo-Producten N. V., Mortsel-Antwerp, Belgium, a company of Belgium No Drawing. Application March 14, 1947, Serial No. 734,852. In Germany September 22, 1943

Section 1, Public Law 690, August 8, 1946
Patent expires September 22, 1963

6 Claims. (Cl. 95—6)

This invention relates to color photography materials and particularly to color photography materials containing diffusion-fast color couplers and dyestuffs and to methods for making color photography images.

The dyestuffs and color couplers incorporated in multi-layer material for color photography generally tend to pass from their proper layer into the adjacent layers, that is, to diffuse. Consequently, color distortion and unsharpness of the images arise. In order to prevent these defects, several remedies have already been proposed. Thus, color couplers which by the introduction of prescribed groups acquire substantive properties to the binder have been suggested.

Furthermore, it is known to introduce into the dyestuffs or into the color couplers certain groups to render them diffusion-fast in gelatine as, for example, aliphatic carbon chains of more than five carbon atoms, hydroaromatic or hydrogenated heterocyclic radicals, sterine groups, carbohydrate groups, polypeptide groups, resin groups and groups of high polymeric compounds.

It is also known to use as diffusion-fast color couplers dyestuffs such as indigo dyestuffs or their leuco derivatives substituted by a radical which contains a coupling function and which can be split off in a later treatment. Together with such compounds, isatin-alpha-meta-hydroxyanil has also been proposed.

Finally, cyano-, acyl- or carbalkoxy-acetyl-amino derivatives of N-containing heterocyclic compounds are known as color couplers of low diffusion.

Now I have found that dyestuffs and color couplers are diffusion-fast in gelatine if they contain in their molecule a polyisatin group of the following general formula

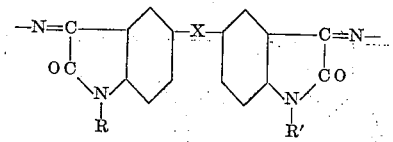

wherein R and R'=H, alkyl, aryl, aralkyl, X=a divalent atom or atom grouping such as —O—, —CH₂—, —O—CH₂—CH₂—O—, —CH₂—O—CH₂—

—CH₂—CH₂—, wherein one or more hydrogen atoms may be substituted as, for example:

—CH—
|
C₆H₅

—CH—

R—N—CO
       |
       C= wherein R has the same significance as above.

Furthermore, the hydrogen atoms of the benzol ring in the isatin nucleus may be replaced by any desired substituents.

For the preparation of the new diffusion-fast dyestuffs or color couplers, a compound of the general formula (NH₂—C₆H₄—)ₙX (X=di-, tri-, or quadrivalent atom or atom grouping; n=2, 3 or 4), for example, p-p'-diaminodiphenylmethane or p-p'-diaminodiphenylene oxide is caused to react in the known way with chloral hydrate and hydroxylamine hydrochloride in diluted hydrochloric solution and in the presence of sodium sulphate. The n-fold isonitroso derivative thus obtained, after heating with concentrated sulphuric acid, is poured upon cracked ice, whereby the corresponding n-fold isatin is produced (Org. Synth., Coll. Vol. I, p. 321). The dyestuffs or couplers of the invention are obtained by the condensation of these polyisatins with 1-, 2-, 3- or 4-molecules of a suitable compound containing an amido or hydrazine group. The condensation takes place readily in the presence of sodium acetate (Möhlau und Ritter, J. pr. Chem. (2), 73, p. 469).

The condensation of a compound containing a hydrazine group with the polyisatine may be effected in the same manner as the condensation of a hydrazine with various ketones described in Berichte 27 (1894), 688; 40 (1907), 712; and 41 (1908), 643.

lected from the group consisting of —CN, acyl and carbalkoxy.

6. A photographic element comprising at least one light-sensitive silver halide emulsion layer containing a color coupler fast to diffusion which corresponds to the following general formula

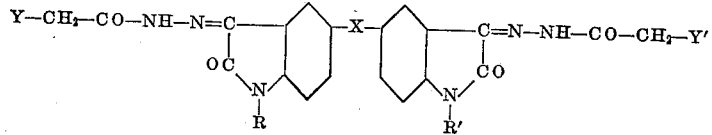

wherein R and R' represent a member selected from the group consisting of hydrogen, alkyl, aryl and aralkyl, X represents a divalent atom grouping, and Y and Y' represent —CN.

PHILIBERT LEOPOLD
JOZEF RAYMOND MERCKX.

REFERENCES CITED

The following references are of record in the file of this patent:

UNITED STATES PATENTS

| Number | Name | Date |
|---|---|---|
| 2,249,541 | Schinzel | July 15, 1941 |
| 2,334,495 | Kendall | Nov. 16, 1943 |